(12) United States Patent
Guha

(10) Patent No.: US 9,436,584 B2
(45) Date of Patent: Sep. 6, 2016

(54) SAAS PLATFORM FOR GEO-LOCATION SIMULATION

(71) Applicant: Ronnie Guha Guha, Brooklyn, NY (US)

(72) Inventor: Ronnie Guha Guha, Brooklyn, NY (US)

( * ) Notice: Subject to any disclaimer, the term of this patent is extended or adjusted under 35 U.S.C. 154(b) by 30 days.

(21) Appl. No.: 14/656,040

(22) Filed: Mar. 12, 2015

(65) Prior Publication Data

US 2015/0261656 A1 Sep. 17, 2015

Related U.S. Application Data

(60) Provisional application No. 61/952,184, filed on Mar. 13, 2014.

(51) Int. Cl.
*G06F 9/44* (2006.01)
*G06F 11/36* (2006.01)

(52) U.S. Cl.
CPC ....... *G06F 11/3664* (2013.01); *G06F 11/3668* (2013.01)

(58) Field of Classification Search
None
See application file for complete search history.

(56) References Cited

U.S. PATENT DOCUMENTS

| | | | | |
|---|---|---|---|---|
| 8,239,840 B1* | 8/2012 | Czymontek | ............... | G06F 8/34 717/125 |
| 2007/0219708 A1* | 9/2007 | Brasche | ................ | G01C 21/32 701/457 |
| 2011/0320116 A1* | 12/2011 | DeMaio | ................. | G01S 17/88 701/457 |
| 2011/0320879 A1* | 12/2011 | Singh | .................... | H04W 24/06 714/38.1 |
| 2012/0157210 A1* | 6/2012 | Hall | ....................... | A63F 13/10 463/40 |
| 2013/0079152 A1* | 3/2013 | Hall | ....................... | H04W 4/02 463/42 |
| 2013/0187930 A1* | 7/2013 | Millman | ................. | G06T 13/20 345/473 |
| 2014/0129693 A1* | 5/2014 | Rahnama | .......... | G06F 17/30002 709/223 |
| 2014/0195664 A1* | 7/2014 | Rahnama | .......... | G06F 17/30528 709/223 |

* cited by examiner

*Primary Examiner* — Daxin Wu

(57) ABSTRACT

A Software as a Service (SaaS) platform for geo-location simulation to test a location based application is provided. The SaaS platform comprises a simulator and a client connected to a server through a network. The simulator receives location data corresponding to one or more geo-locations, and a user motion data corresponding to a user motion associated with one or more geo-locations. The simulator acquires a geo-simulation data corresponding to the geo-locations. The simulator processes the geo-simulation data, and the user motion data to simulate the geo-location for the user motion. Furthermore, the simulated geo-location is provided for testing the location based application.

16 Claims, 6 Drawing Sheets

FIG. 3

Prior art

SAAS PLATFORM FOR GEO-LOCATION SIMULATION

CROSS-REFERENCE TO RELATED APPLICATION

This application claims benefit of priority of U.S. Provisional Patent Application Ser. No. 61/952,184, filed Mar. 13, 2014, entitled "GEOLOCATION AND USER MOTION SIMULATION FOR LOCATION BASED APPLICATION DEVELOPMENT", owned by the assignee of the present application and herein incorporated by reference in its entirety.

TECHNICAL FIELD

The present embodiments generally relate to integrated development environments (IDEs) and more particularly relate to IDEs for location based mobile applications.

BACKGROUND

Integrated development environments (IDEs) provide an interface through which developers can author, modify, compile and deploy software on. Among the plurality of applications developed and tested, IDEs enable development and testing of location based or location enabled applications. Currently available IDEs that provide a testing platform for location based applications includes an iOS based development environment as depicted in FIG. 1. However, the iOS based development environment provides only limited options for simulating geographical locations where a developed application (application) can be tested. For developers (users) having a location specific content (for example, navigational applications like Skout, telenav, foursquare) it is quite difficult to robustly test the application for global scenarios worldwide. Further, for testing the location based application for real life scenarios, the testing process demands physically travelling to those locations. Another existing android based development environment used for testing location based application is depicted in FIG. 2. The android based development environment provides simulation of any geographical location provided by a user. The information of the geographical location can be provided in terms of latitude and longitude parameters as shown in FIG. 2. The android based development platform requires creation of GPS eXchange files (GPX files) or Keyhole Markup Language Files (KML files) for a geographical location entered by the user. Further, the above created files need to be added to Android Dalvik Debug Monitor Server (DDMS). The creation of the GPX files or the KML files requires above-average coding skills, for example, even in the simplest formats, in order to create GPX files or KML files, a developer has to work with data, as shown in FIG. 3. Alternatively, the developer may also upload the GPX files and the KML files into the emulator, which can be used to simulate geolocations (points). However, only those points that are predefined in the KML/GPX files can be simulated. In other words, the developer cannot test their applications on any location other than those geo-locations that fall exactly on the lines defined by the GPX/KML files or exactly the latitude/longitude coordinates defined in the simulator. Thus, the android based approach is not only cumbersome but also impose limitations.

Another existing approach for testing location based applications involves field testing. Most developers carry out field testing of their applications by employing people who use the application in neighborhoods of a geographic location, where the application needs to be tested. However, one may also want to test the behavior of a location based application in Paris, in spite of the application written while being physically located in India. Field testing requires the developer to employ a workforce that would walk/drive around various neighborhoods of different geolocations and test the applications' behavior (or issues with the same) in those locations. This existing method does not provide a scalable model and is very labor intensive.

Thus, a method that provides a robust and simple simulation process that enhances developer's capability to write scalable, location-aware software applications will be appreciated.

SUMMARY OF THE INVENTION

The present invention relates to a Software as a Service (SaaS) platform for implementing a method of geo-location simulation testing of an application, wherein said SaaS platform comprises a server connected to a simulator through a network, the simulator is configured to: i) receive a plurality of input parameters from a User Interface (UI) through a client in said SaaS platform, wherein said input parameters comprise a location data corresponding to at least one geo-location and a user motion data corresponding to a user motion associated with said at least one geo-location; ii) acquire a geo-simulation data corresponding to said location data; and iii) process said geo-simulation data, and said user motion data to simulate said at least one geo-location in accordance with said user motion.

In an embodiment, the present invention relates to a method for geo-location simulation using a Software as a Service (SaaS) platform, the method comprising a simulator configured to perform the following steps of:
i) receiving plurality of input parameters, wherein said input parameters comprise a location data corresponding to at least one geo-location and a user motion data corresponding to a user motion associated with said at least one geo-location; ii) acquiring a geo-simulation data corresponding to said location data; and iii) processing said geo-simulation data, and said user motion data to simulate said at least one geo-location in accordance with said user motion.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 3 illustrates an exemplary program code used at the time of testing a location based mobile application to create GPX/KML files.

DETAILED DESCRIPTION OF INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein relates to a Software as a Service (SaaS) platform and a method implemented for geo-location simulation testing of a location based application. The SaaS platform provides a simulator that receives a location data corresponding to one or more geo-locations and a user motion data corresponding to a user motion through a User Interface (UI) in a client system. The simulator acquires a geo-simulation data corresponding to one or more geo locations by communicating with a server in the SaaS platform. Further, the simulator processes the acquired geo-simulation data along with the user motion data and provides, through the client, simulation of one or more geo locations to test the location based applications. In an embodiment, the server communicates with one or more third party applications to obtain the geo-simulation data.

Unlike existing methods for testing geolocation based applications that either provide limited geo-location simulation environment, or require field testing to test real life scenarios, the present method and the SaaS platform eliminates the need to deploy human resources out on the field for testing of the location based application. The simulator in the SaaS platform speeds up testing with a plurality of real time scenarios to provide more accurate picture of the application performance thus providing a scalable testing environment. Thus, less manpower required for testing and availability of faster test results indirectly reduces the costs of testing.

In an embodiment, the simulator, the client, the UI and the location based application are present within a developer machine. In an embodiment, the developer machine may comprise a lap top, a desktop, a mobile device and the like.

Figure 1:
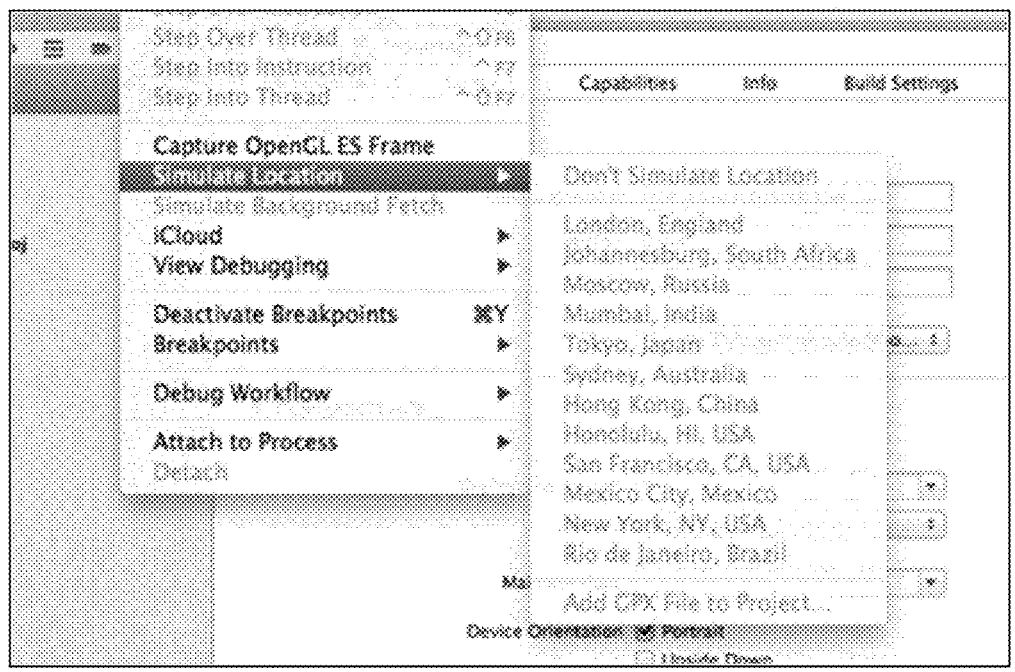
FIG. 1 illustrates a screenshot of an iOS based development environment for testing of location based applications.
Figure 2:
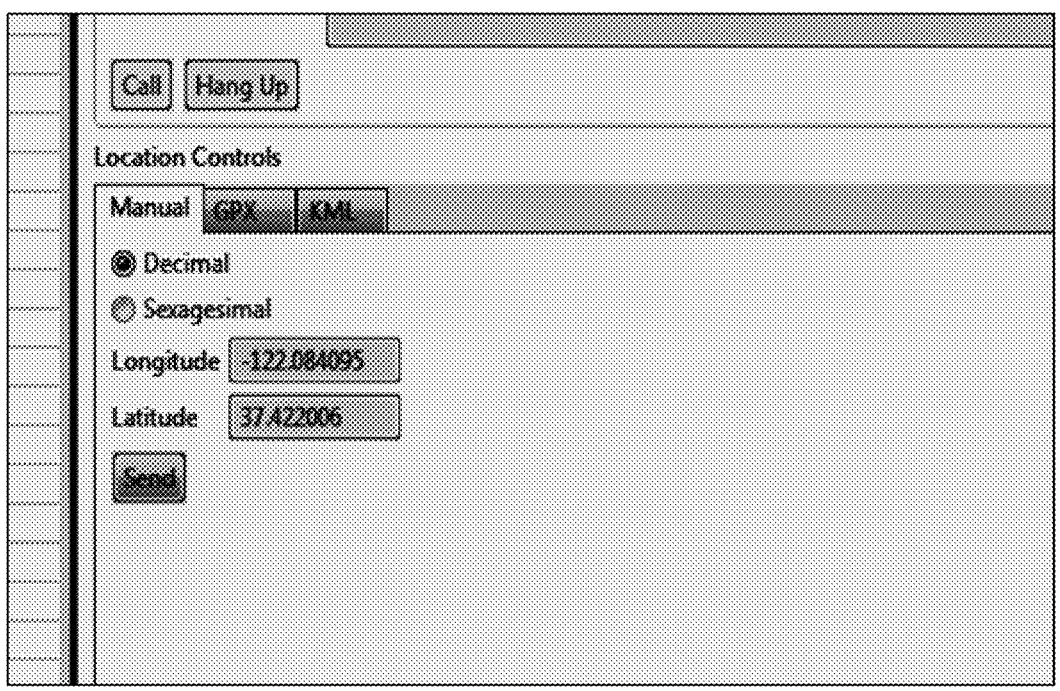
FIG. 2 illustrates a screenshot of an android based development environment for testing of location based applications.
Figure 4:
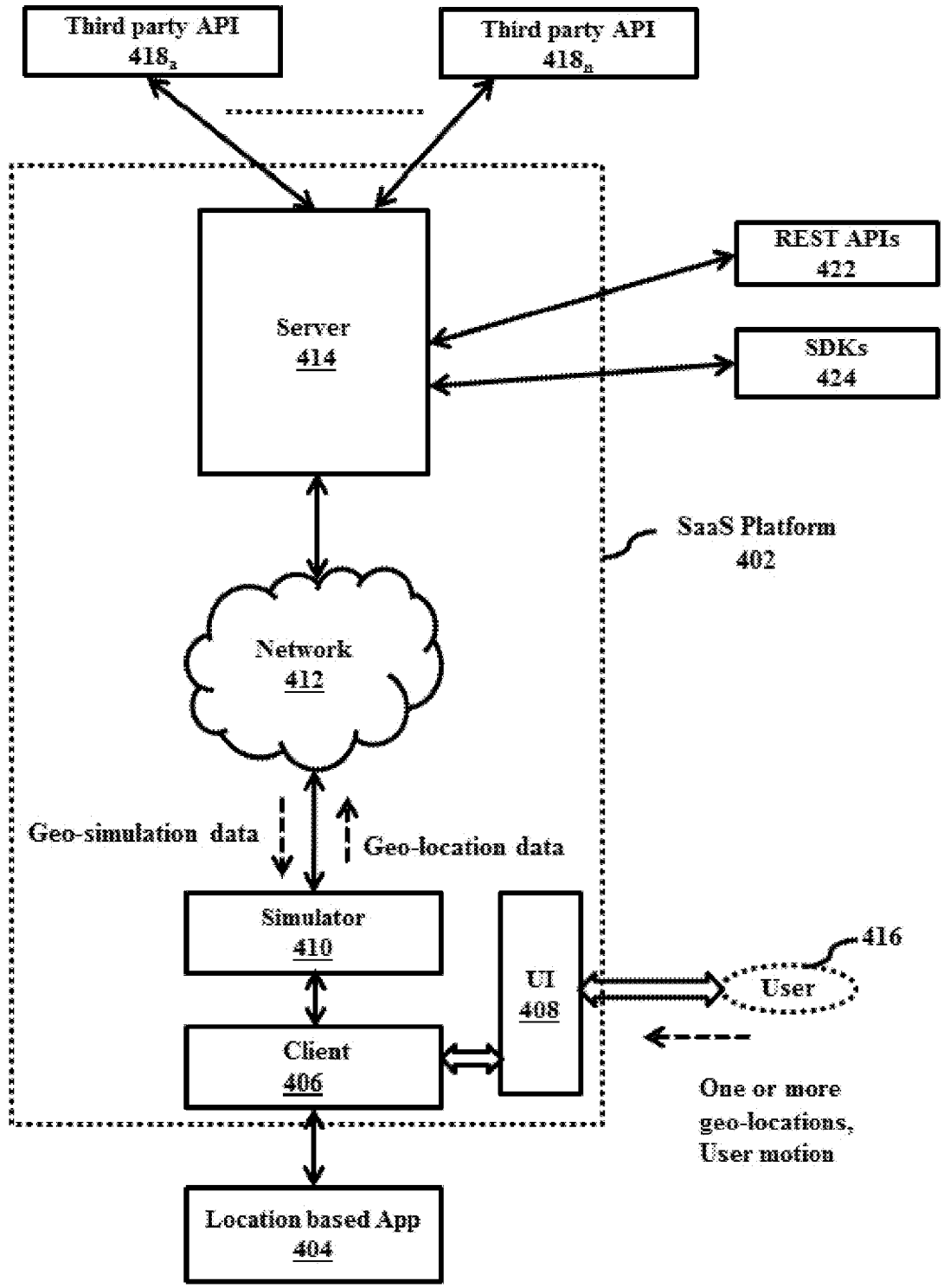
FIG. 4 illustrates an overview of a Software as a Service (SaaS) platform for a geo-location simulation testing of location based application, according to an embodiment of the present invention.
Figure 5:
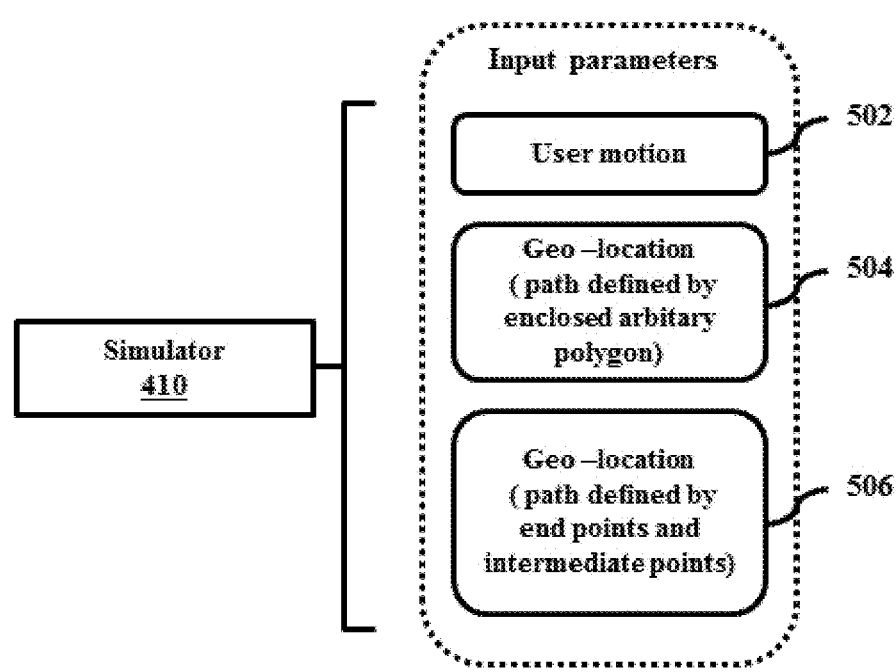
FIG. 5 illustrates a simulator receiving a plurality of input parameters for simulating one or more geo-locations associated with a user motion, according to an embodiment of the present invention.
Figure 6:
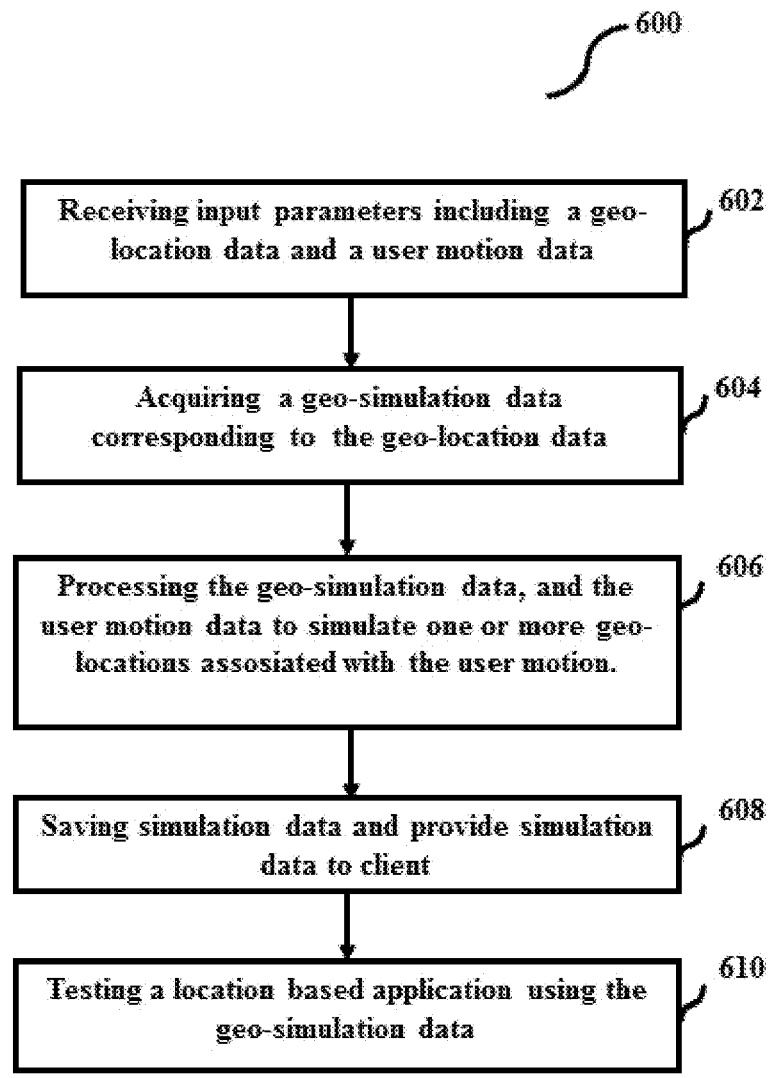
FIG. 6 is a flow diagram illustrating a method for the geo-location simulation testing of al location based application, according to an embodiment of the present invention.

Referring now to the drawings, and more particularly to FIGS. 4 through 6, where similar reference characters denote corresponding features consistently throughout the figures, there are shown preferred embodiments.

FIG. 4 illustrates an overview of the SaaS platform 402 for geo-location simulation, according to an embodiment as disclosed herein. In an embodiment, the SaaS platform 402 includes a client 406, a simulator 410, a user interface and a server 414 connected through a network 412. A User Interface (UI) 408 of the SaaS platform 402 allows a user 416 to communicate with the client 406. The client 406, enables communicating to and fro between the simulator 410, a user 416 and a location based application 404. The client 406 receives input parameters through the UI 408 for simulating one or more geo-locations to test the location based application 404 (location based app).

The input parameters may include but are not limited to a user motion data specifying the expected user motion and one or more geo-location of interest for simulating a real life scenario to test the location based application 404 for that scenario. For example, the user motion may specify the speed and the type of motion such as walking, driving and the like. One or more geo locations from the user may specify start and end points of the geo-locations for the specified the user motion. The simulator 410 is configured to receive the user motion data of the user motion and a location data of one or more geo-locations, provided by the user 416, from the client 406. The UI 408 may be a graphical UI that allows the user 416 to point, click and choose areas (geo-locations) of interest in the client 406. Once the user 416 indicates the areas of interest to the SaaS platform 402, the simulated geo-locations based on areas of interest can be generated.

The simulator 410, upon receiving the location data, is configured to acquire the corresponding geo-simulation data by communicating with the server 414 through a network 412. Further, the server 412 interacts with one or more third party application program interface (third party API 418a to third party API 418n) for acquiring the geo-simulation data required by the simulator 410. The third party applications may include external geo-location sources, for example, Google, Bing, and Yahoo that can provide the geo simulation data for simulating the geo location of interest. The simulator 410 then processes the acquired geo-simulation data and the user motion data to simulate the geo-location. Further, the simulator 410 is configured to send the simulated geo-location to the client 406.

In an embodiment, the client 406 is configured to request the simulated geo-locations on a push/pull basis. For example, the user can decide to obtain simulated geo-locations for turn by turn driving directions from point A to point B. In this case, the SaaS platform 402 initiates the connection (push) with the user and delivers simulated geo-location for the user to act upon. The user 416 can also request simulated geo-locations (pull) on a need basis for simulation scenarios that involve geo-locations from within a circle, polygon, arbitrary shape etc.

In an embodiment, representational state transfer (REST) APIs 422 may be used to allow any location based application to interact with the SaaS platform 402. The REST APIs 422 expose different functionalities available in the SaaS platform 402 for consumption via any application that needs the SaaS platform's 402 functionality.

In an embodiment, the user 416 may also use software development kits (SDKs) 424 for various mobile application platforms that allow a location based application to interact with the SaaS platform 402. The SDKs 424 are to be used by any location based application and allow easy access to the entire SaaS platform's 402 features.

Thus, the proposed SaaS platform 402 allows the user 416 to test location based services (LBS) applications globally by quick, scalable and robust simulation of any geo-location without need to travel down to these places. The user motion data and the geo location data that can be provided to the simulator for providing corresponding simulated geo location are described further in conjunction with FIG. 5.

In an embodiment, the simulator 410 is configured to provide simulation of geo-locations that are contained within arbitrarily shaped areas (e.g. randomly defined or regular boundaries around geographical areas). For example, providing simulation of geo-locations that are contained exactly on a randomly shaped line. These geo-locations may be simulated and obtained sequentially or randomly from this arbitrarily shaped line.

In an embodiment, the simulator 410 is configured to simulate geo-locations from a collection of data points (layers). For example, the user 416 may request simulated geo-locations of any random store of Walmart. If the user 416 has created a list of addresses of Walmart, the SaaS platform 402 converts this address data and provides such simulated geo-locations of stores of Walmart.

FIG. 5 illustrates a plurality of input parameters received by the simulator 410 for simulating one or more geo-locations associated with the user motion, according to an embodiment of the present invention. The input parameters include the user motion and geo-location information provided by the user 416. The user 416 can request for simulating a user motion 502 associated with geo location 506 from one end point (geo-location) to other end point (geo-location) with left/right turns along the streets.

For example, the user motion 502 can be simulated as a choice between driving or walking at a pre-defined speed. For the user motion, the user 416 can also request for simulating a geo-location in any arbitrary polygons 504 or neighborhoods globally. For example, circles or polygons 504 are translated to arbitrarily defined neighborhoods or areas in the world. The user 416 may request for simulating a location on any arbitrary path or streets worldwide as long as geo-location coordinates are available for those locations.

For example, when the client 406 forwards the user 416 request for simulating geo-locations for driving, the simulator acquires the geo-simulation data from the server 414. The server 414 fetches the geo-simulation data for driving directions from one or more third party applications 418 such as Google, Yahoo, MapQuest and the like by using their APIs. Once the simulator 410 receives these directions, the simulator 410 calculates the number of geo-locations required to satisfy the user's 416 request.

Thus, if the user 416 has requested geo-location to be simulated every 5 feet or every 5 minutes, the simulator processes and determines the number of geo-locations required by the user 416 within 5 feet or 5 minutes. Then, the simulator 410 identifies the geo-locations for the calculated points based on the equation y=mx+b by drawing the straight lines. If the required points do not fall in a straight line, then the simulator 410 calculates multiple short straight lines to determine the geo-location of the final point required. After calculating the geo-locations of all the points that lie on the user requested directions, the simulator 410 then saves the set of data points in a cache. The simulator then responds to the client request by providing the geo-locations at a predetermined interval. If the client has requested simulated geo-locations every 5 seconds, the simulator "calls back" the client application every 5 seconds. If the client has requested simulated geo-locations every 50 feet, then the simulator 410 calculates the time for call back the client 406 back based on the speed requested by the client and the distance requested (i.e. 50 ft). Further, the simulator 410 calls the client 406 back at intervals based on the calculated time period.

FIG. 6 is a flow diagram illustrating a method for implementing the geo-location simulation using a Software as a Service (SaaS) platform for testing a location based application, according to an embodiment. The method 600 comprises steps of: receiving a plurality of input parameters provided by the user through the client, as shown in step 602. The input parameters include but not limited to a location data corresponding to one or more geo-locations, and the user motion data corresponding to the user motion to be associated with one or more geo-locations. In an embodiment, the method allows the simulator to receive the location data and the user motion data from the client. In an embodiment, the location data includes end points and intermediate points of a path, an arbitrary shaped neighborhood for a pre-selected geo-location or the like. The user motion data includes speed of a user, directional information of motion of the user.

At step 604, the method includes acquiring the geo-simulation data corresponding to the location data. In an embodiment, the method allows the simulator to acquire the geo-simulation data for the location data by communicating with the server through the network. Further, the server communicates with one or more third party application to obtain the required geo-simulation data.

At step 606, the method includes processing the geo-simulation data, and the user motion data to simulate the geo-location for the user motion. In an embodiment, the method allows the simulator to process the geo-simulation data, and the user motion data to simulate one or more geo-locations in accordance with the user motion.

At step 608, the method includes saving the simulated geo-location in a cache. Further, the method includes providing the simulated geo-locations to the client. At step 610, the method includes providing the simulated one or more geo-locations for testing the location based application.

In some embodiments, some actions, acts, blocks, steps of the method may be omitted, added, modified, skipped, and the like without departing from the scope of the invention.

The embodiments disclosed herein can be implemented through at least one software program running on at least one hardware device and performing network management functions to control the elements. The elements shown in FIG. 4 and FIG. 5 include blocks which can be at least one of a hardware device, or a combination of hardware device and software module.

The embodiments herein have been described in terms of preferred embodiments; those skilled in the art will recognize that the embodiments herein can be practiced with modification within the spirit and scope of the embodiments as described herein.

What is claimed is:

1. A system implementing a geo-location simulation testing of an application, wherein said system is configured with a simulator, a server and comprises of:

server hardware and a software as a service (SaaS) platform, which is connected to said simulator through a network for implementing said geo-location simulation testing of said application;

a user interface to receive a plurality of input parameters from a user through said SaaS platform, wherein said plurality of input parameters comprise at least a motion type, a speed, and a geological area;

a client application interacting with the following components: said user interface to receive said plurality of input parameters from said user; and said simulator for processing the input parameters along with geo-simulation data from at least one 3rd party location based application;

said simulator interacting with said client application to receive said plurality of input parameters from said user interface and simulating a geo-location application in response to said plurality of input parameters and said geo-simulation data; and said server receiving geo-location simulation results from said simulator and sending said geo-location simulation results along with said speed to said user.

2. The system as claimed in claim 1, wherein said client application is configured to receive said geo-simulation data from said simulator for testing a location based application.

3. The system as claimed in claim 1, wherein said server is configured to acquire said geo-simulation data corresponding to said at least one geo-location data that is sent from one of: at least one third-party application API, a Software Development Kit (SDK), a Representational State Transfer (REST) API.

4. The system as claimed in claim 1, wherein said at least one geo-location data comprises one of end points, an intermediate points of a path, and an arbitrary shaped neighborhood for a pre-selected said at least one geo-location data.

5. The system as claimed in claim 1, wherein said plurality of input parameters received through said user interface comprises of: a location data corresponding to said at least one geo-location data, a user motion data corresponding to a user motion associated with said at least one geo-location data.

6. The system as claimed in claim 5, wherein said user motion data comprises of speed of an activity performed by said user, directional information of motion of said user.

7. A method implementing a geo-location simulation of a location based application, wherein said method comprises of:
receiving a plurality of parameters through a user interface for implementing said method through a software as a service (SaaS) platform, wherein said plurality of input parameters comprise at least a motion type, a speed, and a geological area;
acquiring geo-simulation data from at least one 3rd party location based application corresponding to said plurality of input parameters received through said user interface from a user interacting with said SaaS platform;
processing said geo-simulation data with said plurality of parameters received through said user interface;
conducting said geo-location simulation of said location based application; and
sending back processed geo-simulation data from said geo-location simulation along with said speed to said location based application.

8. The method as claimed in claim 7, wherein said method comprises of providing said geo-simulation data associated with said at least one geo-location data for testing said location based application.

9. The method as claimed in claim 8, wherein said geo-simulation data associated with said at least one geo-location data is acquired by a server as said server communicates with at least one third-party application.

10. The method as claimed in claim 7, wherein said plurality of parameters received through said user interface comprises one of: end points and intermediate points of a path, a user motion data, an arbitrary shaped neighborhood or geofence for a pre-selected said at least one geo-location data, a user motion data.

11. The method as claimed in claim 10, wherein said user motion data comprises speed of an activity performed by said user, directional information of motion of said user.

12. A computer program product comprising a computer readable non-transitory storage medium for storing computer executable program code, wherein said computer executable program code implementing a geo-location simulation of a location based application when executed causing the actions including:
receiving a plurality of parameters through a user interface for implementing said method through a software as a service (SaaS) platform, wherein said plurality of input parameters comprise at least a motion type, a speed, and a geological area;
acquiring geo-simulation data from at least one 3rd party location based application corresponding to said plurality of input parameters received through said user interface from a user interacting with said SaaS platform;
processing said geo-simulation data with said plurality of parameters received through said user interface;
conducting said geo-location simulation of said location based application through a simulator; and
sending back processed geo-simulation data from said simulator along with said speed to said location based application.

13. The computer program product as claimed in claim 12, wherein said product is configured to provide said geo-simulation data associated with said at least one geo-location data for testing said location based application.

14. The computer program product as claimed in claim 13, wherein said geo-simulation data associated with said at least one geo-location data is acquired by a server as said server communicates with at least one third-party application.

15. The computer program product as claimed in claim 12, wherein said plurality of parameters received through said user interface comprises one of: end points and intermediate points of a path, a user motion data, an arbitrary shaped neighborhood for a pre-selected said at least one geo-location data, a user motion data.

16. The computer program product as claimed in claim 15, wherein said user motion data comprises speed of an activity performed by said user, directional information of motion of said user.

* * * * *